(12) United States Patent
Sheth et al.

(10) Patent No.: US 6,826,608 B1
(45) Date of Patent: Nov. 30, 2004

(54) SYSTEM, METHOD AND COMPUTER PROGRAM PRODUCT FOR TRANSLATING SNMP (ASN.1) PROTOCOL DECODES

(75) Inventors: Chintan H. Sheth, Sunnyvale, CA (US); Jeffrey Y. Sternin, San Jose, CA (US)

(73) Assignee: Networks Associates Technology, Inc., Santa Clara, CA (US)

(*) Notice: Subject to any disclaimer, the term of this patent is extended or adjusted under 35 U.S.C. 154(b) by 432 days.

(21) Appl. No.: 10/090,261

(22) Filed: Mar. 1, 2002

(51) Int. Cl.[7] .............................................. G06F 15/173
(52) U.S. Cl. ...................... 709/224; 709/236; 370/252; 714/26; 717/128
(58) Field of Search ................................. 714/141–144, 714/124–135; 370/252; 709/224, 236

(56) References Cited

U.S. PATENT DOCUMENTS

| | | | |
|---|---|---|---|
| 4,636,940 A | * | 1/1987 | Goodwin, Jr. .............. 717/128 |
| 5,506,955 A | * | 4/1996 | Chen et al. .................... 714/26 |
| 5,680,585 A | | 10/1997 | Bruell |

FOREIGN PATENT DOCUMENTS

| | | | |
|---|---|---|---|
| WO | 97/46010 | 12/1997 | ............ H04N/5/44 |
| WO | 99/14891 | 3/1999 | ............ H04L/12/00 |

OTHER PUBLICATIONS

Zeus Documentation: SNMPTRANSLATE, extracted from Zeus Server Website, Jul., 2001.*

* cited by examiner

Primary Examiner—Wen-Tai Lin
(74) Attorney, Agent, or Firm—Zilka-Kotab, PC; Kevin J. Zilka; Christopher J. Hamaty (57) ABSTRACT

A system, method and computer program product are provided for translating protocol decode objects. Initially, a plurality of frames is received. Next, the frames are decoded in order to generate protocol decode objects each with a numerical identifier associated therewith. Still yet, the numerical identifier is translated to a textual identifier. The textual identifier associated with the protocol decode objects are then displayed for facilitating the use of the protocol decode objects during network analysis.

19 Claims, 8 Drawing Sheets

SYSTEM, METHOD AND COMPUTER PROGRAM PRODUCT FOR TRANSLATING SNMP (ASN.1) PROTOCOL DECODES

FIELD OF THE INVENTION

The present invention relates to network analyzers, and more particularly to decoding network communications utilizing a network analyzer.

BACKGROUND OF THE INVENTION

Network assessment tools referred to as "analyzers" are often relied upon to analyze networks communications at a plurality of layers. One example of such analyzers is the Sniffer® device manufactured by Network Associates®, Inc. Analyzers have similar objectives such as determining why network performance is slow, understanding the specifics about excessive traffic, and/or gaining visibility into various parts of the network.

In use, network analyzers often take the form of a program that monitors and analyzes network traffic, detecting bottlenecks and problems. Using this information, a network manager can keep traffic flowing efficiently. A network analyzer can also be used legitimately or illegitimately to capture data being transmitted on a network. For example, a network router reads every packet of data passed to it, determining whether it is intended for a destination within the router's network or whether it should be passed further along the Internet. A router with a network analyzer, however, may be able to read the data in the packet as well as the source and destination addresses. It should be noted that network analyzers may also analyze data other than network traffic. For example, a database could be analyzed for certain kinds of duplication, etc.

Figure 1A:
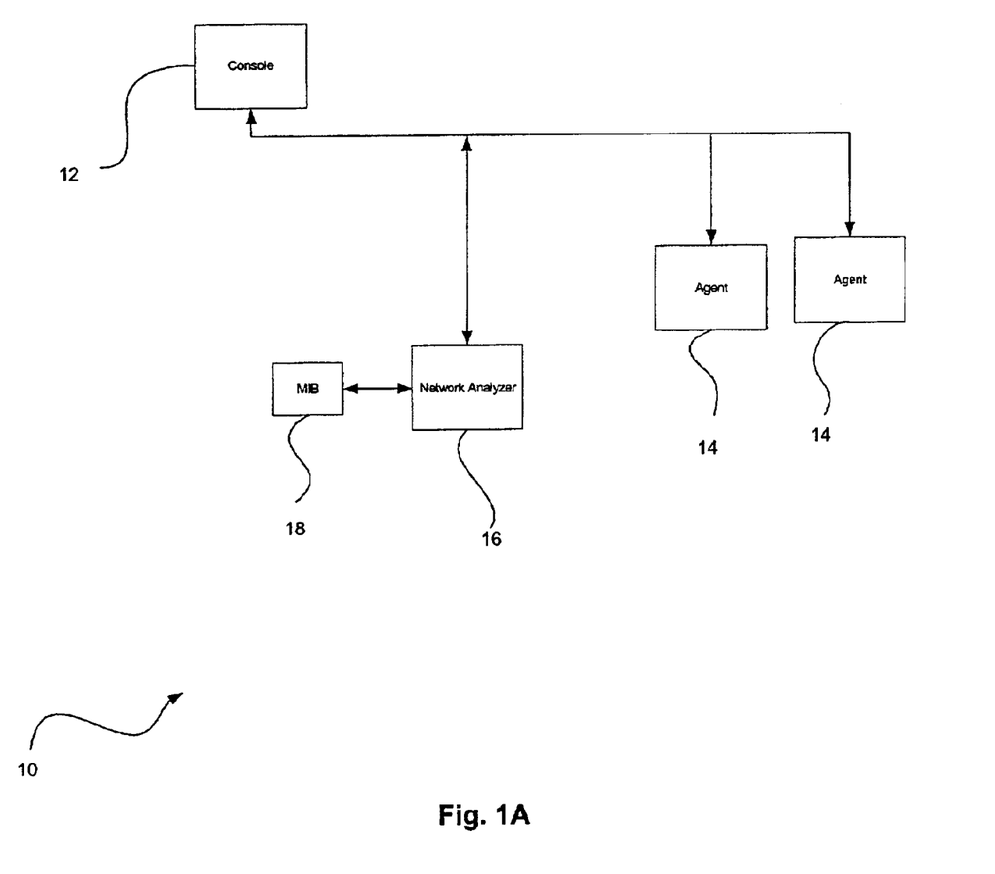
FIG. 1A illustrates an exemplary architecture showing the use of a network analyzer.

Prior Art FIG. 1A illustrates an exemplary architecture 10 showing the use of a network analyzer. In particular, the present example shows the use of a network analyzer in the context of a network using a simple network management protocol (SNMP). As shown, at least one console 12 communicates with a plurality of agents 14 using SNMP.

Coupled to at least one network segment between the console 12 and the agents 14 is a network analyzer 16. In addition to the various network analyzer functionality set forth hereinabove, one particular use of such network analyzer 16 is to decode frames that are communicated between the console 12 and the agents 14 for troubleshooting, etc. Decoding is a well known technique used by network analyzers for understanding the frames of communication.

Figure 1B:
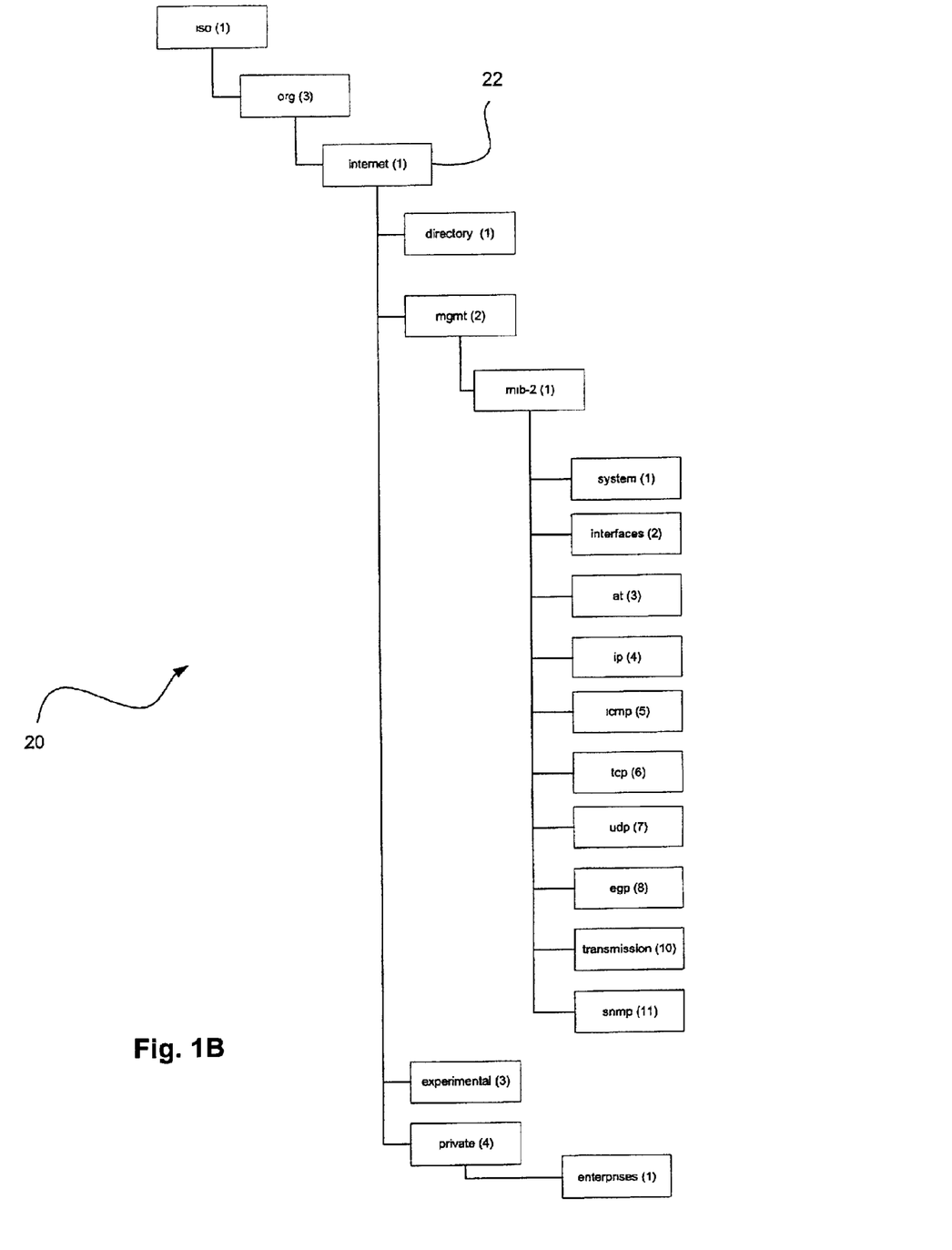
FIG. 1B illustrates an exemplary hierarchical tree structure of objects.

As frames are decoded by the network analyzer 16 data is stored in a buffer "object." In the context of the present description, an object may refer to a buffer, memory, a table or any other set of data that is associated with a specific component of a communication protocol. Often, such objects include a hierarchical tree structure. Prior Art FIG. 1B illustrates an exemplary hierarchical tree structure 20 of objects 22.

In order to accomplish this decoding, the network analyzer 16 is equipped with access to at least one management information base (MIB) 18. MIBs 18 are well known data structures that are traditionally compiled in order to generate software programs used by the network analyzer 16 to decode particular objects. Conventionally, different MIBs 18 are provided for decoding different objects.

Figure 1C:
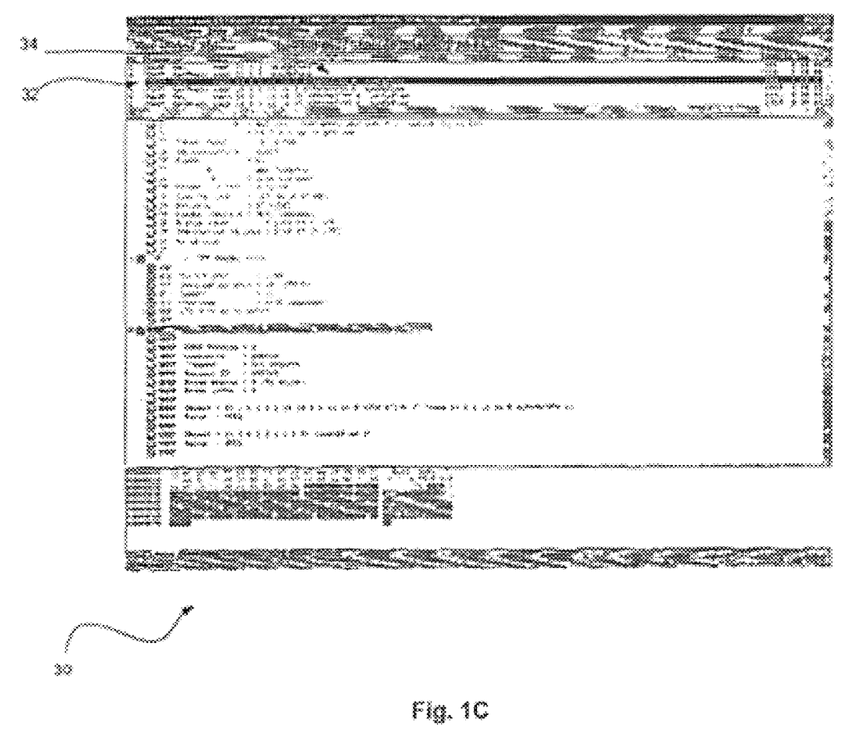
FIG. 1C illustrates a graphical user interface showing a plurality of objects that are displayed as a result of a decode.

Prior Art FIG. 1C illustrates a graphical user interface 30 showing a plurality of objects 32 that are displayed as a result of a decode. As shown, associated with each of such objects 32 are numerical identifiers 34 which identify each of the objects resulting from the decoding. Unfortunately, it is difficult to analyze network traffic represented by such objects using the numerical identifiers 34, since they do not provide any intuitive information. In fact, such numerical identifiers 34 must often be manually deciphered in order to gain a true understanding of the decoded frames.

There is thus a need for a technique of gaining an automatic, intuitive understanding of decoded objects outputted as a result of a network analysis.

DISCLOSURE OF THE INVENTION

A system, method and computer program product are provided for translating protocol decode objects. Initially, a plurality of frames is received. Next, the frames are decoded in order to generate protocol decode objects each with a numerical identifier associated therewith. Still yet, the numerical identifier is translated to a textual identifier. The textual identifier associated with the protocol decode objects are then displayed for facilitating the use of the protocol decode objects during network analysis.

In one embodiment, the protocol may include SNMP (ASN.1). Further, the numerical identifier is translated to a textual identifier utilizing a map. To generate such map, a list of management information bases (MIBs) is initially received from a user. Such MIBs may include a hierarchical structure. Next, the list of MIBs is compiled in order to generate a map. Further, a decoder is loaded with the map so that the numerical identifier may be translated to the textual identifier utilizing the map during the decoding.

As an option, the map may include a look-up table. In particular, the map may include a list of the numerical identifiers each with an associated textual identifier. Further, the textual identifier may include alphanumeric text descriptive of the protocol decode objects.

BRIEF DESCRIPTION OF THE DRAWINGS

Prior Art

Prior Art

Prior Art

DESCRIPTION OF THE PREFERRED EMBODIMENTS

Figure 1D:
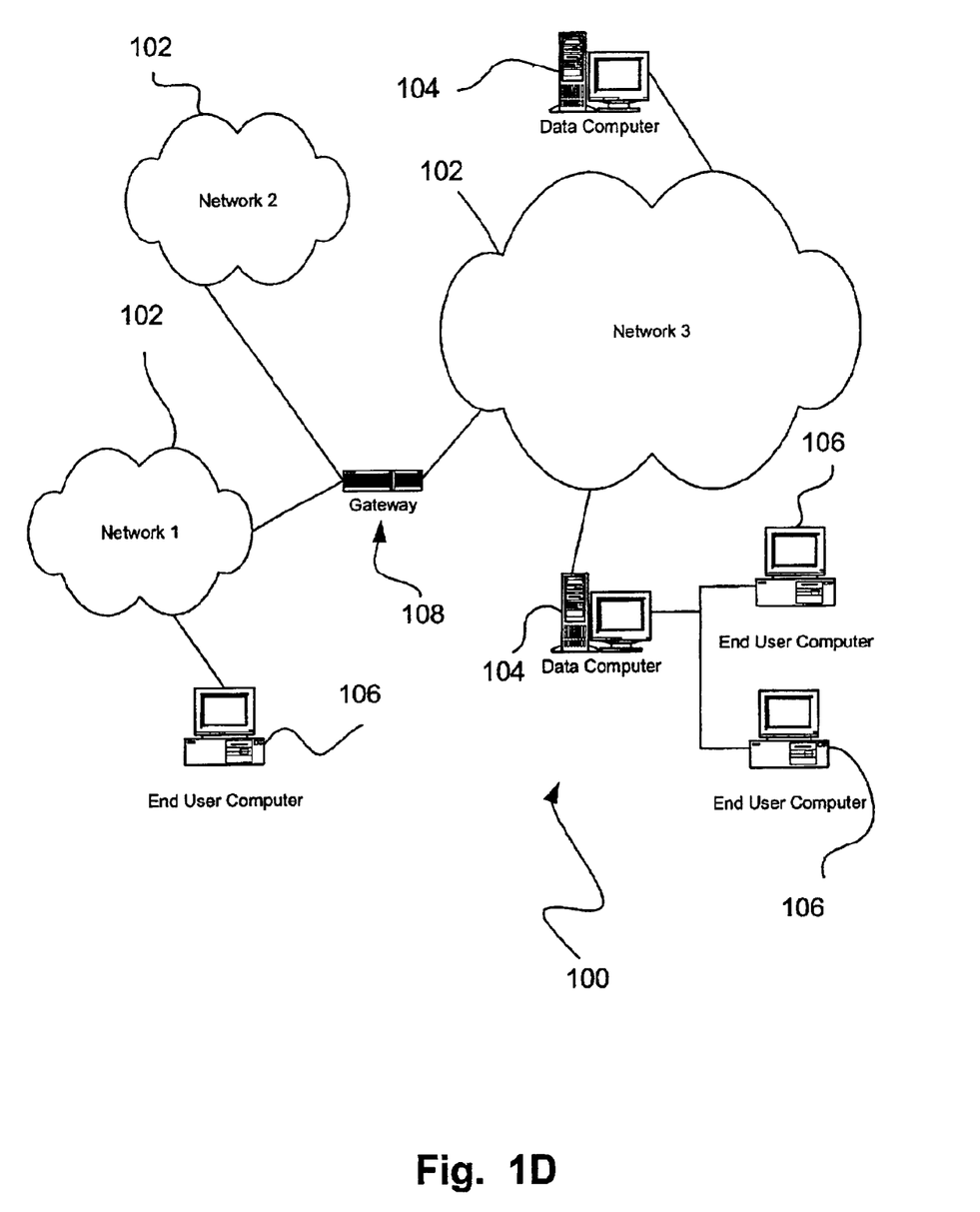
FIG. 1D illustrates an exemplary network environment, in accordance with one embodiment

FIG. 1D illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data servers 104 which are capable of communicating over the networks 102. Also coupled to the networks 102 and the data servers 104 is a plurality of end user computers 106. In the context of the present description, such end user computers 106 may include a web server, desktop computer, lap-top computer, hand-held computer, printer or any other type of hardware/software.

In order to facilitate communication among the networks 102, at least one gateway 108 is coupled there between. It should be noted that each of the foregoing network devices as well as any other unillustrated devices may be interconnected by way of a plurality of network segments. In the context of the present description, a network segment includes any portion of any particular network capable of connecting different portions and/or components of a network.

Figure 2:
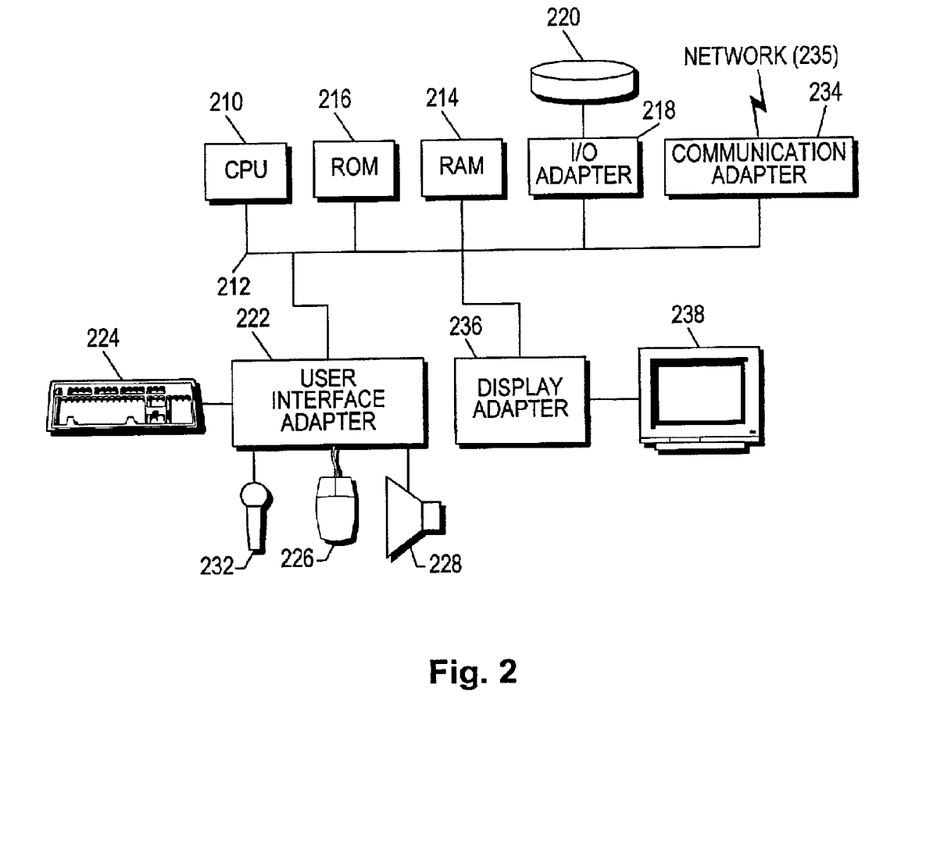
FIG. 2 shows a representative hardware environment associated with the computers of FIG. 1D.

FIG. 2 shows a representative hardware environment that may be associated with the data servers 104 and/or end user computers 106 of FIG. 1D, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
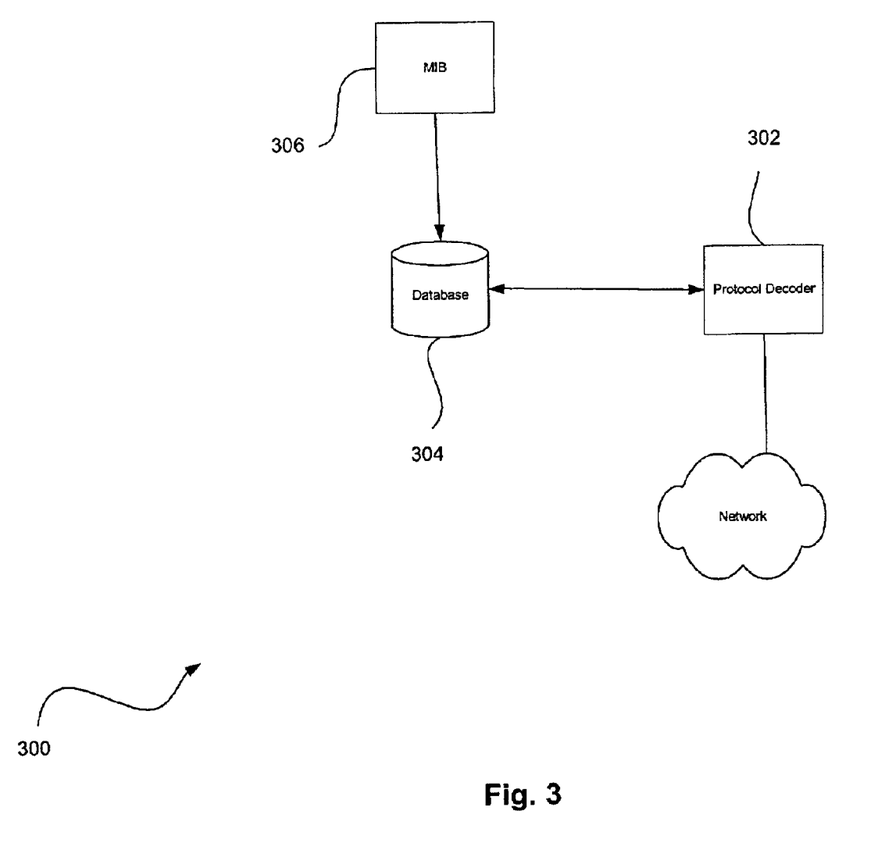
FIG. 3 illustrates a network analyzer framework that may be implemented in the context of the architecture of FIGS. 1D and 2.

FIG. 3 illustrates a network analyzer framework 300 that may be implemented in the context of the architecture of FIGS. 1D and 2. Of course, the network analyzer framework 300 may be implemented in any desired context.

As shown, a protocol decoder 302 is provided that is coupled to any desired device and/or network segment for performing network analysis. One example of such protocol decoder 302 is the Sniffer® device manufactured by Network Associates®, Inc. In use, the protocol decoder 302 is capable of decoding frames of network communication collected from the associated device and/or network segment in order to generate protocol decode objects [i.e. SNMP (ASN.1)]. In addition to decoding, the protocol decoder 302 may further be able to collect any additional information for the purpose of determining why network performance is slow, understanding the specifics about excessive traffic, and/or gaining visibility into various parts of the network.

In the context of the present description, a frame may refer to any component (i.e. packet, a group of packets, etc.) of network communications. Further, protocol decode objects may refer to a buffer, memory, a table or any other set of data that is associated with a specific component of communication protocol. Decoding may refer to any process or method capable of generating the protocol decode objects.

In use, a plurality of frames is received by the protocol decoder 302. Next, the frames are decoded in order to generate protocol decode objects each with a numerical identifier associated therewith. Next, the numerical identifier is translated to a textual identifier. The textual identifiers associated with the protocol decode objects are then displayed for facilitating the use of the protocol decode objects during network analysis. As an option, the textual identifiers may include alphanumeric text descriptive of the protocol decode objects.

In order to accomplish this, the numerical identifier is translated to a textual identifier utilizing a map stored in a database 304. To generate such map, a list of management information bases (MEBs) 306 is initially received from a user. Table #1 illustrates an exemplary MIB.

TABLE #1

```
RFC1213-MIB DEFINITIONS ::= BEGIN
IMPORTS
        mgmt, NetworkAddress, IpAddress, Counter, Gauge,
            TimeTicks
        FROM RFC1155-SMI
     OBJECT-TYPE
            FROM RFC-1212;
    This MIB module uses the extended OBJECT-TYPE macro as
    defined in [14];
    MIB-II (same prefix as MIB-I)
mib-2         OBJECT IDENTIFIER ::= { mgmt 1 }
    textual conventions
DisplayString ::=
    OCTET STRING
    This data type is used to model textual information taken
    from the NVT ASCII character set. By convention, objects
    with this syntax are declared as having
        SIZE (0 . . . 255)
PhysAddress ::=
    OCTET STRING
    This data type is used to model media addresses. For many
    types of media, this will be in a binary representation.
    For example, an ethernet address would be represented as
    a string of 6 octets.
    groups in MIB-II
system        OBJECT IDENTIFIER ::= { mib-2 1 }
interfaces    OBJECT IDENTIFIER ::= { mib-2 2 }
at            OBJECT IDENTIFIER ::= { mib-2 3 }
ip            OBJECT IDENTIFIER ::= { mib-2 4 }
icmp          OBJECT IDENTIFIER ::= { mib-2 5 }
tcp           OBJECT IDENTIFIER ::= { mib-2 6 }
udp           OBJECT IDENTIFIER ::= { mib-2 7 }
egp           OBJECT IDENTIFIER ::= { mib-2 8 }
    historical (some say hysterical)
    cmot      OBJECT IDENTIFIER ::= { mib-2 9 }
transmission  OBJECT IDENTIFIER ::= { mib-2 10 }
snmp          OBJECT IDENTIFIER ::= { mib-2 11 }
    the System group
    Implementation of the System group is mandatory for all
    systems. If an agent is not configured to have a value
    for any of these variables, a string of length 0 is
    returned.
sysDescr OBJECT-TYPE
    SYNTAX    DisplayString (SIZE (0 . . . 255))
    ACCESS    read-only
    STATUS    mandatory
    DESCRIPTION
            "A textual description of the entity. This value
            should include the full name and version
```

TABLE #1-continued

```
                identification of the system's hardware type,
                software operating-system, and networking
                software. It is mandatory that this only contain
                printable ASCII characters."
      ::= { system 1 }
sysObjectID OBJECT-TYPE
      SYNTAX       OBJECT IDENTIFIER
      ACCESS       read-only
      STATUS       mandatory
      DESCRIPTION
                "The vendor's authoritative identification of the
                network management subsystem contained in the
                entity. This value is allocated within the SMI
                enterprises subtree (1.3.6.1.4.1) and provides an
                easy and unambiguous means for determining 'what
                kind of box' is being managed. For example, if
                vendor 'Flintstones, Inc.' was assigned the
                subtree 1.3.6.1.4.1.4242, it could assign the
                identifier 1.3.6.1.4.1.4242.1.1 to its 'Fred
                Router'."
      ::= { system 2 }
sysUpTime OBJECT-TYPE
      SYNTAX       TimeTicks
      ACCESS       read-only
      STATUS       mandatory
      DESCRIPTION
                "The time (in hundredths of a second) since the
                network management portion of the system was last
                re-initialized."
      ::= { system 3 }
sysContact OBJECT-TYPE
      SYNTAX       DisplayString (SIZE (0 . . . 255))
      ACCESS       read-write
      STATUS       mandatory
      DESCRIPTION
                "The textual identification of the contact person
                for this managed node, together with information
                on how to contact this person."
      ::= { system 4 }
sysName OBJECT-TYPE
      SYNTAX       DisplayString (SIZE (0 . . . 255))
      ACCESS       read-write
      STATUS       mandatory
      DESCRIPTION
                "An administratively-assigned name for this
                managed node. By convention, this is the node's
                fully-qualified domain name."
      ::= { system 5 }
sysLocation OBJECT-TYPE
      SYNTAX       DisplayString (Size (0 . . . 255))
      ACCESS       read-write
      STATUS       mandatory
      DESCRIPTION
                "The physical location of this node (e.g.,
                'telephone closet, 3rd floor')."
      ::= { system 6 }
sysServices OBJECT-TYPE
      SYNTAX       INTEGER (0 . . . 127)
      ACCESS       read-only
      STATUS       mandatory
      DESCRIPTION
                "A value which indicates the set of services that
                this entity primarily offers.
                The value is a sum. This sum initially takes the
                value zero, Then, for each layer, L, in the range
                1 through 7, that this node performs transactions
                for, 2 raised to (L − 1) is added to the sum. For
                example, a node which performs primarily routing
                functions would have a value of 4 (2^(3−1)). In
                contrast, a node which is a host offering
                application services would have a value of 72
                (2^(4−1) + 2^(7−1)). Note that in the context of
                the Internet suite of protocols, values should be
                calculated accordingly:
                          layer functionality
                              1 physical (e.g., repeaters)
                              2 datalink/subnetwork (e.g., bridges)
                              3 internet (e.g., IP gateways)
```

TABLE #1-continued

```
                              4 end-to-end (e.g., IP hosts)
                              7 applications (e.g., mail relays)
                For systems including OSI protocols, layers 5 and
                      6 may also be counted."
      ::= { system 7 }
```

The list of MIBs 306 is compiled in order to generate the map. Table #2 illustrates an exemplary map.

TABLE #2

| Numerical_Identifier1 | Textual_Identifer1 |
|---|---|
| Numerical_Identifier2 | Textual_Identifer2 |
| Numerical_Identifier3 | Textual_Identifer3 |
| Numerical_Identifier4 | Textual_Identifer4 |
| Numerical_Identifier5 | Textual_Identifer5 |

As shown, the map may include a list of the numerical identifiers each with an associated textual identifier. One example of a numerical identifier includes "1.3.6.1.2.1.16.14.1.1.11.16.280.4294967295.0." Further, an exemplary associated textual identifier includes "mib-2.rmon(16).nlHost(14).hlHostControlTable(1).hlHostControlEntry(1). hlHostControlOwner(11).16.280.4294967295.0."

The map of Table #2 is generated by using MIBs like that of Table #1 to automatically generate a textual identifier for every possible numerical identifier. This is accomplished by combining textual strings associated with specific numbers of particular components of the numerical identifier.

In use, the database 304 associated with the protocol decoder 302 is loaded with the map so that the numerical identifier may be translated to the textual identifier utilizing the map during the decoding. As an option, the map may include a look-up table.

Figure 4:
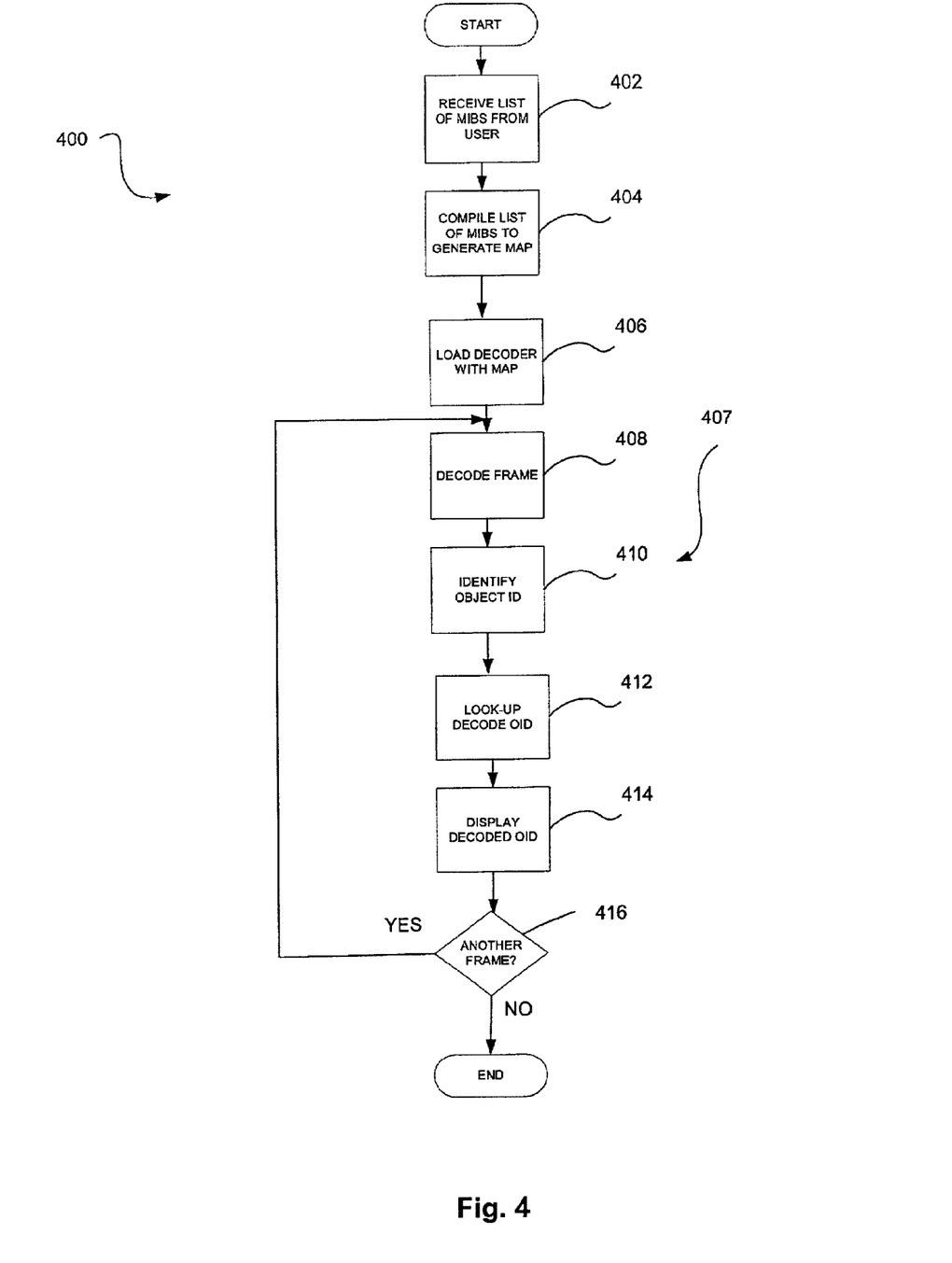
FIG. 4 shows a method for translating protocol decode objects, in accordance with one embodiment.

FIG. 4 shows a method 400 for translating protocol decode objects, in accordance with one embodiment. The method 400 may be implemented in the context of the architecture of FIG. 4. Of course, however, the method 400 may be implemented in any desired environment Initially, in operation 402, a list of MIBs is received from a user. Such MIBs may be selected manually via a graphical user interface, or in any desired automatic manner. Such MIBs may be selected based on which components of a particular protocol are to be decoded. With reference again to FIG. 1B, MIBs associated with various objects of the hierarchical tree structure (i.e. iso, org, internet, directory, management, etc.) may be selected.

Next, in operation 404, the list of MIBs is compiled in order to generate a map. The map may include any look-up table or any other type of data structure capable of indicating a correlation between numerical identifiers associated with the protocol decode objects and textual identifiers, in a manner that will soon be set forth. The manner in which the list of MIBs is compiled may be accomplished in any desired manner. For example, the map may be compiled in the manner set forth in Table #2 hereinabove.

A decoder may then be loaded with the map. See operation 406. This may be accomplished by loading the map in a database associated with the decoder. Of course, the decoder may be loaded with the map in any manner that makes the map accessible to the decoder.

Frames may then be decoded during process 407. In particular, a frame is received and decoded in operation 408.

It should be noted that the frame may be received from a capture file stored previously, or the frame may be received in real-time. At least one protocol decode object is then generated based on the frame.

Each protocol decode object is equipped with a numerical identifier associated therewith during the decoding. This numerical identifier is identified in operation 410. The numerical identifier is then translated to a textual identifier utilizing the map in operation 412. This may be accomplished by way of a look-up operation, or any other desired translation procedure.

Once translated, the textual identifier associated with the protocol decode object is displayed in operation 414 for facilitating the use of the protocol decode object during network analysis. More information relating to an exemplary graphical user interface capable of displaying the textual identifier will be set forth during reference to FIG. 5.

Next, it is determined in decision 416 whether another frame exists. If so, the various operations 408–414 are repeated for each frame.

Figure 5:
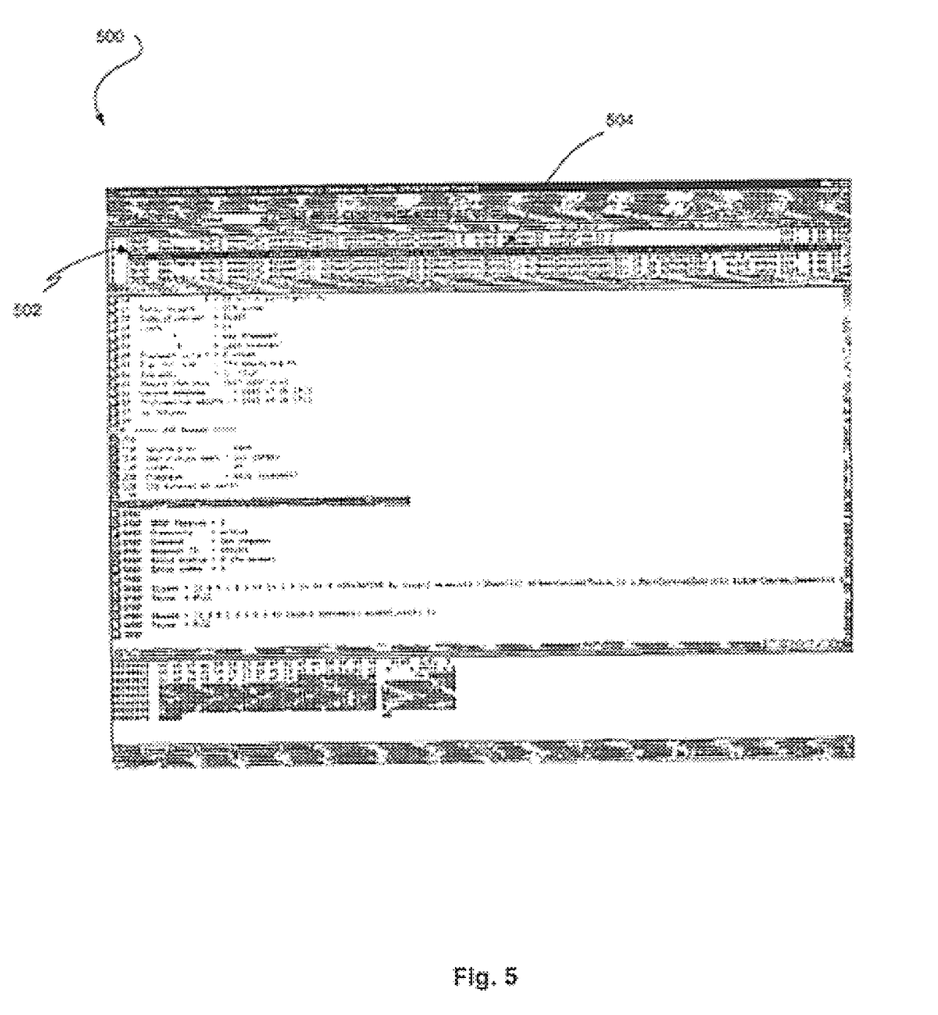
FIG. 5 illustrates a graphical user interface for displaying textual identifiers associated with protocol decode objects, in accordance with one embodiment.

FIG. 5 illustrates a graphical user interface 500 for displaying textual identifiers associated with protocol decode objects, in accordance with one embodiment. As shown, associated with each object 502 is a textual identifier 504 which identifies the object resulting from the decoding in an improved manner.

The present technique may thus use a MIB compile operation in conjunction with protocol decodes. The MIB compile operation may compile all MIBs that the user wants to see in readable form and creates a database of mappings between a numeric representation of object identifiers and textual names of each object identifier. The protocol decoder may use this database to search for names using the numeric value of the object identifier as a key.

The present method is therefore flexible and any MIB can be added to/removed from the database without any changes in code. Any MIB with a valid syntax (including private MIBs) may be used.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for translating protocol decode objects, comprising:
    (a) receiving a plurality of frames;
    (b) decoding the frames in order to generate protocol decode objects each with a numerical identifier associated therewith;
    (c) translating each numerical identifier to a textual identifier; and
    (d) displaying each textual identifier associated with the protocol decode objects for facilitating the use of the protocol decode objects during network analysis;
    wherein a list of management information bases (MIBs) is received from a user utilizing an MIB graphical user interface, where the MIBs are selected based on which of a plurality of protocol components are to be decoded;
    wherein the list of MIBs is compiled in order to generate a map;
    wherein the numerical identifier is translated to the textual identifier utilizing the map;
    wherein the map includes a list of the numerical identifiers each with the associated textual identifier;
    wherein an analysis graphical user interface is included with a summary window for displaying the textual identifier, and a decode window for displaying decoded frames simultaneously with the summary window.

2. The method as recited in claim 1, wherein the MIBs include a hierarchical structure.

3. The method as recited in claim 1, and further comprising loading a decoder with the map.

4. The method as recited in claim 1, wherein the map includes a look-up table.

5. The method as recited in claim 1, wherein the textual identifiers include alphanumeric text descriptive of the protocol decode objects.

6. A method as recited in claim 1, wherein the translation is performed based on Request for Comments (RFC) management information bases (MIBs).

7. A method as recited in claim 1, wherein the protocol decode objects include simple network management protocol (SNMP) decode objects.

8. A computer program product for translating protocol decode objects, comprising:
    (a) computer code for receiving a plurality of frames;
    (b) computer code for decoding the frames in order to generate protocol decode objects each with a numerical identifier associated therewith;
    (c) computer code for translating each numerical identifier to a textual identifier; and
    (d) computer code for displaying each textual identifier associated with the protocol decode objects for facilitating the use of the protocol decode objects during network analysis;
    wherein a list of management information bases (MIBs) is received from a user utilizing an MIB graphical user interface, where the MIBs are selected based on which of a plurality of protocol components are to be decoded;
    wherein the list of MIBs is compiled in order to generate a map;
    wherein the numerical identifier is translated to the textual identifier utilizing the map;
    wherein the map includes a list of the numerical identifiers each with the associated textual identifier;
    wherein an analysis graphical user interface is included with a summary window for displaying the textual identifier, and a decode window for displaying decoded frames simultaneously with the summary window.

9. The computer program product as recited in claim 8, wherein the MIBs include a hierarchical structure.

10. The computer program product as recited in claim 8, and further comprising computer code for loading a decoder with the map.

11. The computer program product as recited in claim 8, wherein the map includes a look-up table.

12. The computer program product as recited in claim 8, wherein the textual identifiers include alphanumeric text descriptive of the protocol decode objects.

13. A system for translating protocol decode objects, comprising:
    (a) logic for receiving a plurality of frames;
    (b) logic for decoding the frames in order to generate protocol decode objects each with a numerical identifier associated therewith;

(c) logic for translating each numerical identifier to a textual identifier; and
(d) logic for displaying each textual identifier associated with the protocol decode objects for facilitating the use of the protocol decode objects during network analysis:
   wherein a list of management information bases (MIBs) is received from a user utilizing an MIB graphical user interface, where the MIBs are selected based on which of a plurality of protocol components are to be decoded;
   wherein the list of MIBs is compiled in order to generate a map;
   wherein the numerical identifier is translated to the textual identifier utilizing the map;
   wherein the map includes a list of the numerical identifiers each with the associated textual identifier;
   wherein an analysis graphical user interface is included with a summary window for displaying the textual identifier, and a decode window for displaying decoded frames simultaneously with the summary window.

14. A system for translating protocol decode objects, comprising:
   (a) means for receiving a plurality of frames;
   (b) means for decoding the frames in order to generate protocol decode objects each with a numerical identifier associated therewith;
   (c) means for translating each numerical identifier to a textual identifier; and
   (d) means for displaying each textual identifier associated with the protocol decode objects for facilitating the use of the protocol decode objects during network analysis;
   wherein a list of management information bases (MIBs) is received from a user utilizing an MIB graphical user interface, where the MIBs are selected based on which of a plurality of protocol components are to be decoded;
   wherein the list of MIBs is compiled in order to generate a map;
   wherein the numerical identifier is translated to the textual identifier utilizing the map;
   wherein the map includes a list of the numerical identifiers each with the associated textual identifier;
   wherein an analysis graphical user interface is included with a summary window for displaying the textual identifier, and a decode window for displaying decoded frames simultaneously with the summary window.

15. A method for translating protocol decode objects, comprising:
   (a) receiving a list of management information bases (MIBs) from a user;
   (b) compiling the list of MIBs in order to generate a map;
   (c) loading a decoder with the map; and
   (d) decoding a plurality of frames utilizing the map;
   wherein the list of MIBs is received from the user utilizing an MIB graphical user interface, where the MIBs are selected based on which of a plurality of protocol components are to be decoded;
   wherein a numerical identifier is translated to a textual identifier utilizing the map;
   wherein the map includes a list of the numerical identifiers each with the associated textual identifier;
   wherein an analysis graphical user interface is included with a summary window for displaying the textual identifier, and a decode window for displaying decoded frames simultaneously with the summary window.

16. A computer program product for translating protocol decode objects, comprising:
   (a) computer code for receiving a list of management information bases (MIBs) from a user;
   (b) computer code for compiling the list of MIBs in order to generate a map;
   (c) computer code for loading a decoder with the map; and
   (d) computer code for decoding a plurality of frames utilizing the map;
   wherein the list of MIBs is received from the user utilizing an MIB graphical user interface, where the MIBs are selected based on which of a plurality of protocol components are to be decoded;
   wherein a numerical identifier is translated to a textual identifier utilizing the map;
   wherein the map includes a list of the numerical identifiers each with the associated textual identifier;
   wherein an analysis graphical user interface is included with a summary window for displaying the textual identifier, and a decode window for displaying decoded frames simultaneously with the summary window.

17. A data structure stored in memory for translating protocol decode objects, comprising:
   (a) a map object for correlating numerical identifiers of protocol decode objects with textual identifiers;
   (b) wherein the textual identifiers associated with the protocol decode objects are adapted for facilitating the use of the protocol decode objects during network analysis;
   wherein a list of management information bases (MIBs) is received from a user utilizing an MIB graphical user interface, where the MIBs are selected based on which of a plurality of protocol components are to be decoded;
   wherein the list of MIBs is compiled in order to generate the map object, which includes a map;
   wherein the numerical identifiers are translated to the textual identifiers utilizing the map;
   wherein the map includes a list of the numerical identifiers each with the associated textual identifier;
   wherein an analysis graphical user interface is included with a summary window for displaying the textual identifiers, and a decode window for displaying decoded frames simultaneously with the summary window.

18. A method for translating protocol decode objects, comprising:
   (a) receiving a list of management information bases (MIBs) from a user;
   (b) compiling the list of MIBs in order to generate a map;
   (c) loading a decoder with the map;
   (d) decoding a frame including:
      (i) receiving a frame,
      (ii) generating at least one SNMP (ASN.1) protocol decode object with a numerical identifier associated therewith during the decoding, and
      (iii) translating the numerical identifier to a textual identifier utilizing the map; and
   (e) displaying the textual identifier associated with the protocol decode object for facilitating the use of the protocol decode object during network analysis;
   (f) determining whether another frame exists; and
   (g) repeating (d)–(f) based on whether it is determined that another frame exists;

wherein the list of MIBs is received from the user utilizing an MIB graphical user interface, where the MIBs are selected based on which of a plurality of protocol components are to be decoded;

wherein the map includes a list of the numerical identifiers each with the associated textual identifier;

wherein an analysis graphical user interface is included with a summary window for displaying the textual identifier, and a decode window for displaying decoded frames simultaneously with the summary window.

19. A method for translating simple network management protocol (SNMP) decode objects, comprising:

receiving a plurality of frames;

decoding the frames in order to generate SNMP decode objects;

translating each SNMP decode object to a textual identifier based on Request for Comments (RFC) information; and displaying each textual identifier associated with the SNMP decode objects for facilitating the use of the SNMP decode objects during network analysis;

wherein the textual identifiers include alphanumeric text descriptive of the SNMP decode objects;

wherein a list of management information bases (MIBs) is received from a user utilizing an MIB graphical user interface, where the MIBs are selected based on which of a plurality of protocol components are to be decoded;

wherein the list of MIBs is compiled in order to generate a map;

wherein numerical identifiers are translated to the textual identifiers utilizing the map;

wherein the map includes a list of the numerical identifiers each with the associated textual identifier;

wherein an analysis graphical user interface is included with a summary window for displaying the textual identifiers, and a decode window for displaying decoded frames simultaneously with the summary window.

* * * * *